(12) United States Patent
Nakakita et al.

(10) Patent No.: US 7,061,721 B2
(45) Date of Patent: Jun. 13, 2006

(54) SLIDER HAVING A STABLE FLYING POSTURE AND DISK DEVICE INCLUDING THE SLIDER

(75) Inventors: Masaru Nakakita, Ehime (JP); Yoshihiro Ueno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 434 days.

(21) Appl. No.: 10/169,112

(22) PCT Filed: Oct. 31, 2001

(86) PCT No.: PCT/JP01/09543

§ 371 (c)(1),
(2), (4) Date: Sep. 9, 2002

(87) PCT Pub. No.: WO02/37496

PCT Pub. Date: May 10, 2002

(65) Prior Publication Data

US 2003/0053254 A1    Mar. 20, 2003

(30) Foreign Application Priority Data

Oct. 31, 2000   (JP)   .............................. 2000-333410

(51) Int. Cl.
*G11B 5/60* (2006.01)

(52) U.S. Cl. .................................................. 360/235.4
(58) Field of Classification Search ................ 360/237, 360/236.3, 234.6, 235, 235.4
See application file for complete search history.

(56) References Cited

U.S. PATENT DOCUMENTS

| 5,917,678 | A | | 6/1999 | Ito et al. ................... 360/235.4 |
| 5,918,068 | A | | 6/1999 | Shafe' |
| 5,973,880 | A | | 10/1999 | Hashimoto et al. ....... 360/236.2 |
| 6,144,529 | A | * | 11/2000 | Wada et al. ............. 360/236.1 |
| 6,147,838 | A | | 11/2000 | Chang et al. |
| 6,229,671 | B1 | * | 5/2001 | Boutaghou et al. ....... 360/235.1 |
| 6,639,755 | B1 | * | 10/2003 | Boutaghou et al. ....... 360/235.7 |

FOREIGN PATENT DOCUMENTS

| JP | 8-249127 | 9/1996 |
| JP | 10-027326 | 1/1998 |
| JP | 10-083643 | 3/1998 |
| JP | 10-083644 | 3/1998 |
| JP | 10-091931 | 4/1998 |
| JP | 10-228743 | 8/1998 |
| JP | 2000-132823 | 5/2000 |
| WO | 00/00977 | 1/2000 |

* cited by examiner

*Primary Examiner*—David Davis
(74) *Attorney, Agent, or Firm*—Wenderoth, Lind & Ponack, L.L.P.

(57) ABSTRACT

A slider maintains a uniform flying posture and a predetermined flying height by suppressing variations of roll angle and flying height. At an air bearing surface of the slider, an edge line on an air influx end side and an edge line at a disk outer circumference side end are connected by an edge line having a recess angle θ (rad) with respect to an abscissa. The edge line on the air influx end side and an edge line at the disk inner circumference side end are connected by an edge line having a recess angle η (rad) with respect to the abscissa, thereby forming a concave part, and when a distance "x" from an air influx end to the concave part of the air bearing surface is standardized by a length L of the slider to make X=x/L, the recess angles θ and η are as follows: $0.06 \times \pi/X < \theta < 0.12 \times \pi/X$, and $0.05 \times \pi/X < \eta < 0.13 \times \pi/X$.

9 Claims, 12 Drawing Sheets cross section A-A cross section A-A cross section A-A

Fig.21 (b) cross section A-A

Fig.22 (b) cross section A-A cross section A-A

SLIDER HAVING A STABLE FLYING POSTURE AND DISK DEVICE INCLUDING THE SLIDER

TECHNICAL FIELD

The present invention relates to a slider and a disk device and, more particularly, to a slider which flies from a disk medium by airflow between an air bearing surface and the disk medium, and a disk device which employs this slider.

BACKGROUND ART

In recent years, the data recording density of magnetic disk devices has been remarkably enhanced, and its annual increase rate is said to be some 150%. According to this remarkable increase in the data recording density, the recording capacity of the magnetic disk devices is drastically enhanced. The increase in the data recording capacity promotes size reduction of the magnetic disk devices, and there are being practically used disk devices with high cost effect, such as one disclosed in Japanese Published Patent Application No. Hei. 8-249127, which replace semiconductor memories of various electronic devices such as cameras, facsimiles, portable phones, modems, beepers, hand-held computing equipments, printers, and copy machines.

A current magnetic device is provided with a rotation-type actuator like a tone arm of a record player, so as to obtain a high access rate. A slider is attached to the end of an actuator arm. The surface of the slider that is opposed to a disk medium is an air bearing surface. The slider draws an airflow generated by rotation of the disk medium between the air bearing surface and the surface of the disk medium, whereby the slider flies from the disk medium. That is, the slider forms and maintains a self-pressure-type air bearing film between the slider and the disk medium storage surface. Accordingly, the flying altitude of the slider with respect to the surface of the disk medium, that is, a distance between the disk medium surface and the slider, is equivalent to the thickness of the air bearing film. Due to this film, less mechanical contact is caused between the slider and the disk medium during the rotation of the disk medium, thereby suppressing friction and wear.

The slider has a magnetic head for writing data on the disk medium or reading the data from the disk medium, inside. The magnetic head is generally arranged in the vicinity of the air efflux end on the air bearing surface of the slider that is opposed to the disk medium.

Since the rotation-type actuator is used as described above, directions of movement between the slider and the disk medium and the airflow under the slider are no longer uniform, and they have various angles with respect to the ordinate of the slider (an axis supposed to pass in the center of the slider in the direction of a long side of the slider or the actuator). Further, a high-speed searching operation of the accessing actuator causes the direction of the movement between the slider and the disk medium and the direction of the airflow under the slider to be inclined with respect to the ordinate. Thus, in a recent magnetic disk device having the rotation-type actuator, the movement direction is no longer equal to the ordinate direction from the front of the slider to the back thereof, or the direction slightly deviated from the ordinate direction.

Here, an angle formed by the disk medium movement direction with the ordinate of the slider is referred to as a skew angle. When the actuator arm is located at the outside end of the disk medium or outside thereof, the skew angle is positive. When the actuator arm is located so that the movement direction corresponds to the inside end of the disk medium or the hub thereof, the skew angle is negative.

In the magnetic disk device, a flying height of the slider with respect to the disk medium at recording/reproduction tends to be decreased with an increase in the recording density. This decrease in the flying height is achieved by a so-called negative-pressure-use-type slider as disclosed in Japanese Patents No. 1505878, No. 2778518, No. 2803639, and the like, in which the air bearing surface of the slider is formed by plural approximately plane surfaces of different heights. Positive pressure (pressure acting in the direction in which the slider gets far from the disk medium) is generated on the approximately plane surfaces which are formed high so as to narrow a gap between the slider and the disk medium, while negative pressure (pressure acting in the direction in which the slider gets near to the disk medium) is generated on the approximately plane surfaces which are formed low so as to enlarge the gap between the slider and the disk medium, and the positive pressure and the negative pressure are balanced, thereby making the slider fly.

As described above, when data access is performed in the magnetic disk device, the slider moves in a range from the inner circumference of the disk medium to the outer circumference thereof, and, at this time, a flying height and posture of the slider are varied. This is because, in the magnetic disk device having the rotation-type actuator, not only a relative velocity between the slider and the disk medium but also the skew angle are varied according to a radius position on the disk medium, so that a distribution of air pressure generated on the air bearing surface is varied. The variation of the slider flying height deteriorates electromagnetic conversion efficiency of the magnetic head. Particularly, in a magnetic disk device requiring high recording density, the flying height at a position of the magnetic head is required to be uniform from the inner circumference of the disk medium to the outer circumference thereof and, further, stricter restrictions are placed on the flying height variation with reduction in the slider flying height.

Further, when the slider is required to fly at a predetermined height at the above-described magnetic head position, the variation of the slider flying posture, particularly the variation of a roll angle in the direction of the slider abscissa, causes reduction of the flying height at a position of the minimum flying height and, thus, brings the slider and the disk medium into contact, resulting in a risk of inducing so-called head crush.

In a magnetic disk device currently under development that employs a disk medium of minor diameter such as 27 mm, a relative velocity between the slider and the disk medium differs greatly from that in a magnetic disk device employing a disk medium of, for example, 95 mm or 84 mm in diameter. Thus, sufficient flying force cannot be obtained from airflow and, therefore, it is further difficult to maintain a predetermined flying height and a uniform flying posture. This becomes a major concern in developing small-size magnetic disk devices.

The present invention is made to solve the above-mentioned problems and has for its object to provide a slider which can maintain a uniform flying posture and a predetermined flying height by suppressing variations of the roll angle and the flying height of the slider, and a disk device employing this slider.

SUMMARY OF THE INVENTION

According to a first aspect of the present invention, there is provided a slider having a head for recording and/or reproducing data on/from a disk medium and an air bearing surface, and flying from the disk medium by airflow between the air bearing surface and the disk medium, wherein the air bearing surface has an edge line on an air influx end side and an edge line at a disk outer circumference side end that are connected by an edge line having a recess angle θ (rad) with respect to an abscissa which is supposed to exist in the slider width direction, thereby forming a concave part, and when a distance "x" from the air influx end to the concave part of the air bearing surface is standardized by a length L of the slider to make X=x/L, the recess angle θ is $0.06 \times \pi/X < \theta < 0.12 \times \pi/X$.

According to the present invention, a roll angle of the slider in a region where a skew angle is positive can be controlled so that its variation is equal to or smaller than a desired value and, thus, a stable flying posture of the slider is obtained in the region where the skew angle is positive, thereby securing a stable flying height at a position of minimum flying height.

According to a second aspect of the present invention, in the slider as defined in the first aspect, the edge line having the recess angle θ is formed on the disk outer circumference side of the ordinate which is supposed to pass in the center of the slider in the slider longitudinal direction.

According to the present invention, variation is not caused with respect to the roll angle in a region where the skew angle is negative.

According to a third aspect of the present invention, in the slider as defined in the first aspect, θ×X is approximately 0.09π.

According to the present invention, variation of the roll angle of the slider in the region where the skew angle is positive can be near "0" and, thus, a stable flying posture of the slider is obtained in the region where the skew angle is positive, thereby securing a stable flying height at a position of minimum flying height.

According to a fourth aspect of the present invention, there is provided a slider having a head for recording and/or reproducing data on/from a disk medium and an air bearing surface, and flying from the disk medium by airflow between the air bearing surface and the disk medium, wherein the air bearing surface has an edge line on an air influx end side and an edge line at a disk inner circumference side end that are connected by an edge line having a recess angle η (rad) with respect to an abscissa which is supposed to exist in the slider width direction, thereby forming a concave part, and when a distance "x" from the air influx end to the concave part of the air bearing surface is standardized by a length L of the slider to make X=x/L, the recess angle η is $0.05 \times \pi/X < \eta < 0.13 \times \pi/X$.

According to the present invention, a roll angle of the slider in a region where a skew angle is negative can be controlled so that its variation is equal to or smaller than a desired value and, thus, a stable flying posture of the slider is obtained in the region where the skew angle is negative, thereby securing a stable flying height at a position of minimum flying height.

According to a fifth aspect of the present invention, in the slider as defined in the fourth aspect, the edge line having the recess angle η is formed on the disk inner circumference side of the ordinate which is supposed to pass in the center of the slider in the slider longitudinal direction.

According to the present invention, variation is not caused with respect to the roll angle in a region where the skew angle is positive.

According to a sixth aspect of the present invention, in the slider as defined in a fourth aspect, η×X is approximately 0.09π.

According to the present invention, variation of the roll angle of the slider in the region where the skew angle is negative can be near "0" and, thus, a stable flying posture of the slider is obtained in the region where the skew angle is negative, thereby securing a stable flying height at a position of minimum flying height.

According to a seventh aspect of the present invention, there is provided a slider having a head for recording and/or reproducing data on/from a disk medium and an air bearing surface, and flying from the disk medium by airflow between the air bearing surface and the disk medium, wherein the air bearing surface has an edge line on an air influx end side and an edge line at a disk outer circumference side end that are connected by an edge line having a recess angle θ (rad) with respect to an abscissa which is supposed to exist in the slider width direction, and the edge line on the air influx end side and an edge line at a disk inner circumference side end that are connected by an edge line having a recess angle η (rad) with respect to the abscissa, thereby forming a concave part, and when a distance "x" from the air influx end to the concave part of the air bearing surface is standardized by a length L of the slider to make X=x/L, the recess angles θ and η are $0.06 \times \pi/X < \theta < 0.12 \times \pi/X$, and $0.05 \times \pi/X < \eta < 0.13 \times \pi/X$.

According to the present invention, a roll angle of the slider in both regions where a skew angle is positive and where the skew angle is negative can be controlled so that its variation is equal to or smaller than a desired value and, thus, a stable flying posture of the slider is obtained in the whole region of the skew angle, thereby securing a stable flying height at a position of minimum flying height.

According to an eighth aspect of the present invention, in the slider as defined in the seventh aspect, the edge line having the recess angle θ is formed on the disk outer circumference side of the ordinate which is supposed to pass in the center of the slider in the slider longitudinal direction.

According to the present invention, variation is not caused with respect to the roll angle in the region where the skew angle is negative, and the roll angle of the slider in both of the regions where the skew angle is positive and where the skew angle is negative can be controlled so that its variation is equal to or smaller than a desired value.

According to a ninth aspect of the present invention, in the slider as defined in the seventh aspect, θ×X is approximately 0.09π.

According to the present invention, variation of the roll angle of the slider in the region where the skew angle is positive can be near "0", and the roll angle of the slider in both of the regions where the skew angle is positive and where the skew angle is negative can be controlled so that its variation is equal to or smaller than a desired value.

According to a tenth aspect of the present invention, in the slider as defined in the seventh aspect, the edge line having the recess angle η is formed on the disk inner circumference side of the ordinate which is supposed to pass in the center of the slider in the slider longitudinal direction.

According to the present invention, variation is not caused with respect to the roll angle in the region where the skew angle is positive, and the roll angle of the slider in both of the regions where the skew angle is positive and where the skew angle is negative can be controlled so that its variation is equal to or smaller than a desired value.

According to an eleventh aspect of the present invention, in the slider as defined in the seventh aspect, η×X is approximately 0.09π.

According to the present invention, variation of the roll angle of the slider in the region where the skew angle is negative can be near "0", and the roll angle of the slider in both of the regions where the skew angle is positive and where the skew angle is negative can be controlled so that its variation is equal to or smaller than a desired value.

According to a twelfth aspect of the present invention, there is provided a slider having a head for recording and/or reproducing data on/from a disk medium and an air bearing surface that has a concave part for generating negative pressure, and flying from the disk medium by airflow between the air bearing surface and the disk medium, wherein the air bearing surface has an air influx side pad which is located on an air influx end side of the concave part, and is the top approximately plane surface on the air bearing surface, and a relative velocity between the slider and the disk medium at a position where a skew angle formed by the ordinate which is supposed to pass in the center of the slider in the slider longitudinal direction, and the disk rotating direction is 0(rad), is V(mm/s), a difference in level between the air influx side pad and an approximately plane surface formed on the air influx end side with respect to the air influx side pad is "d" (mm), and a distance from the air influx end to the air influx side pad is "y" (mm), the following expression is obtained: V×(d/y)<1.5.

According to the present invention, a flying height increase at a position where the disk radius is larger than a track at a position where a skew angle is 0(rad) is suppressed, and thus variation of the flying height can be suppressed so as to be equal to or smaller than a desired value over the whole disk radius, thereby securing a stable flying height at all the positions on the disk medium.

According to a thirteenth aspect of the present invention, in the slider as defined in the twelfth aspect, the following expression is obtained: V×(d/y)<1.0.

According to the present invention, a flying height increase at a position where the disk radius is larger than a track at a position where a skew angle is 0(rad) is further suppressed stably, and thus variation of the flying height can be suppressed so as to be equal to or smaller than a desired value over the whole disk radius, thereby securing a stable flying height at all the positions on the disk medium.

According to a fourteenth aspect of the present invention, in the slider as defined in the twelfth aspect, the approximately plane surface formed on the air influx end side of the air influx side pad extends to the air influx end.

According to the present invention, a desired air bearing surface is formed, thereby securing a stable flying height and flying posture at all the positions on the disk medium.

According to a fifteenth aspect of the present invention, in the slider as defined in the twelfth aspect, the air influx side pad includes a cross rail extending in the direction of the abscissa of the slider.

According to the present invention, it is possible to provide a slider which has a desired air bearing surface formed, and has its flying height variation suppressed in all the regions on the disk medium.

According to a sixteenth aspect of the present invention, there is provided a disk device having the slider as defined in the first aspect.

According to the present invention, it is possible to realize a stable flying posture and suppressed flying variation of the slider in all the regions on the disk medium.

According to a seventeenth aspect of the present invention, in the disk device as defined in the sixteenth aspect, a region where a relative velocity between the slider and the disk medium at a position where a skew angle is 0(rad) is equal to or smaller than 13(m/s), is employed.

According to the present invention, a roll angle can be suppressed so that its variation is equal to or smaller than a desired value in all the regions on the disk, and thus a stable flying height of the slider can be obtained.

According to an eighteenth aspect of the present invention, the disk device as defined in the sixteenth aspect is based on the PCMCIA standard.

According to the present invention, it is possible to provide a very small disk device based on the PCMCIA standard, having high recording density and reliability.

According to a nineteenth aspect of the present invention, the disk device as defined in the sixteenth aspect is based on the Compact Flash standard.

According to the present invention, it is possible to provide a very small disk device based on the Compact Flash standard, having high recording density and reliability.

According to a twentieth aspect of the present invention, there is provided a disk device having the slider as defined in claim 4.

According to the present invention, it is possible to realize a stable flying posture and suppressed flying variation of the slider in all the regions on the disk medium.

According to a twenty-first aspect of the present invention, in the disk device as defined in the twentieth aspect, a region where a relative velocity between the slider and the disk medium at a position where a skew angle is 0(rad) is equal to or smaller than 13(m/s), is employed.

According to the present invention, a roll angle can be suppressed so that its variation is equal to or smaller than a desired value in all the regions on the disk, and thus a stable flying height of the slider can be obtained.

According to a twenty-second aspect of the present invention, the disk device as defined in the twentieth aspect is based on the PCMCIA standard.

According to the present invention, it is possible to provide a very small disk device based on the PCMCIA standard, having high recording density and reliability.

According to a twenty-third aspect of the present invention, the disk device as defined in the twentieth aspect is based on the Compact Flash standard.

According to the present invention, it is possible to provide a very small disk device based on the Compact Flash standard, having high recording density and reliability.

According to a twenty-fourth aspect of the present invention, there is provided a disk device having the slider as defined in the seventh aspect.

According to the present invention, it is possible to realize a stable flying posture and suppressed flying variation of the slider in all the regions on the disk medium.

According to a twenty-fifth aspect of the present invention, in the disk device as defined in the twenty-fourth aspect, a region where a relative velocity between the slider and the disk medium at a position where a skew angle is 0(rad) is equal to or smaller than 13(m/s), is employed.

According to the present invention, a roll angle can be suppressed so that its variation is equal to or smaller than a desired value in all the regions on the disk, and thus a stable flying height of the slider can be obtained.

According to a twenty-sixth aspect of the present invention, in the disk device as defined in the twenty-fourth aspect, the concave part is formed symmetrically with respect to the ordinate which is supposed to pass in the center of the slider in the slider longitudinal direction.

According to the present invention, especially when a head is arranged on the ordinate of the slider, variation of the roll angle is minimized, and thus a stable flying height and flying posture can be secured at all the positions on the disk medium.

According to a twenty-seventh aspect of the present invention, in the disk device as defined in the twenty-fourth aspect, the air bearing surface is formed symmetrically with respect to the ordinate which is supposed to pass in the center of the slider in the slider longitudinal direction.

According to the present invention, especially when a head is arranged on the ordinate of the slider, variation of the roll angle is minimized, and thus a stable flying height and flying posture can be secured at all the positions on the disk medium.

According to a twenty-eighth aspect of the present invention, the disk device as defined in the twenty-fourth aspect is based on the PCMCIA standard.

According to the present invention, it is possible to provide a very small disk device based on the PCMCIA standard, having high recording density and reliability.

According to a twenty-ninth aspect of the present invention, the disk device as defined in the twenty-fourth aspect is based on the Compact Flash standard.

According to the present invention, it is possible to provide a very small disk device based on the Compact Flash standard, having high recording density and reliability.

According to the thirtieth aspect of the present invention, there is provided a disk device having the slider as defined in the twelfth aspect.

According to the present invention, it is possible to realize a stable flying posture and suppressed flying variation of the slider in all the regions on the disk medium.

According to a thirty-first aspect of the present invention, in the disk device as defined in the thirtieth aspect, the concave part is formed symmetrically with respect to the ordinate which is supposed to pass in the center of the slider in the slider longitudinal direction.

According to the present invention, especially when a head is arranged on the ordinate of the slider, variation of the roll angle is minimized, and thus a stable flying height and flying posture can be secured at all the positions on the disk medium.

According to a thirty-second aspect of the present invention, in the disk device as defined in the thirtieth aspect, the air bearing surface is formed symmetrically with respect to the ordinate which is supposed to pass in the center of the slider in the slider longitudinal direction.

According to the present invention, especially when a head is arranged on the ordinate of the slider, variation of the roll angle is minimized, and thus a stable flying height and flying posture can be secured at all the positions on the disk medium.

According to a thirty-third aspect of the present invention, the disk device as defined in the thirtieth aspect is based on the PCMCIA standard.

According to the present invention, it is possible to provide a very small disk device based on the PCMCIA standard, having high recording density and reliability.

According to a thirty-fourth aspect of the present invention, the disk device as defined in the thirtieth aspect is based on the Compact Flash standard.

According to the present invention, it is possible to provide a very small disk device based on the Compact Flash standard, having high recording density and reliability.

BRIEF DESCRIPTION OF DRAWINGS

FIG. 5($b$) is a diagram illustrating the cross section of the air bearing surface according to the first embodiment of the invention.

FIG. 7($b$) is a diagram illustrating the cross section of the air bearing surface according to the first embodiment of the invention.

FIG. 9($b$) is a diagram illustrating the cross section of the air bearing surface according to the first embodiment of the invention.

BEST MODE TO EXECUTE THE INVENTION

Embodiment 1

Hereinafter, a slider and a disk device according to a first embodiment of the present invention will be described with reference to the drawings.

Figure 1:
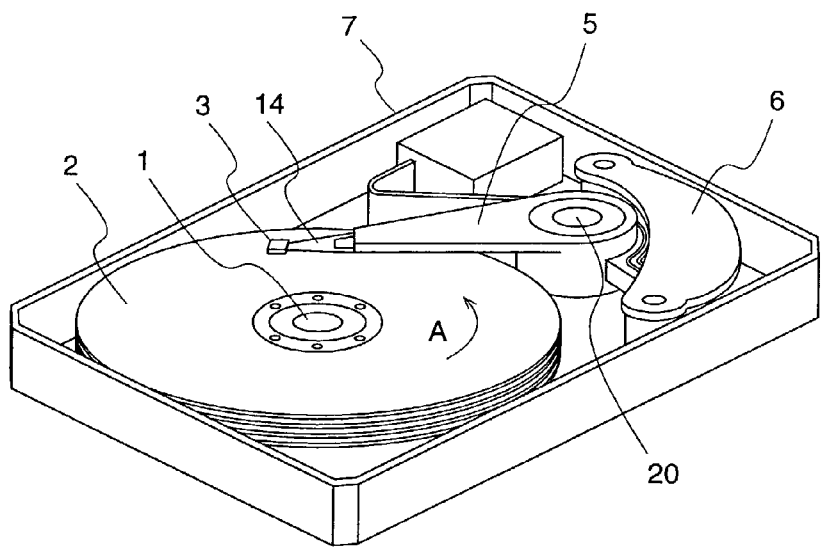
FIG. 1 is a perspective view illustrating the interior of a magnetic disk device according to a first embodiment of the present invention.
Figure 2:
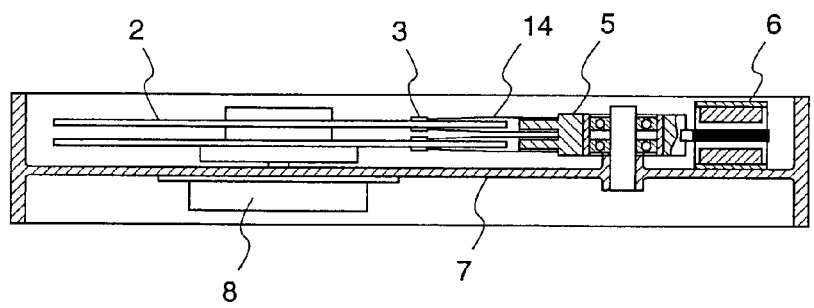
FIG. 2 is a cross sectional view illustrating the magnetic disk device according to the first embodiment of the invention.

FIG. 1 is a perspective view illustrating the interior of a magnetic disk device. FIG. 2 is a cross sectional view illustrating the magnetic disk device. The magnetic disk device has a housing cover (not shown), which covers a disk medium 2, a slider 3, and the like. A pair of actuator arms 5, which is attached to an actuator axis 20 so as to be rotated, is rotated about the actuator axis 20 by power of a voice coil motor 6. The suspension 14 is attached to each end of the actuator arm pair 5. A slider 3 having an electromagnetic converter or a magnetic head (not shown in FIG. 1) is attached to each end of the suspension 14.

A main axis 1 is provided in a housing 7, and a number of disk media 2 are attached to the main axis 1 so as to rotate, with spaces left therebetween. The disk medium 2 rotates with the main axis 1 which is rotated by a motor 8, in the direction shown by an arrow A in FIG. 1. A position of the magnetic head held by the slider 3, on the disk medium 2 is decided by the actuator arm pair 5. The magnetic head writes data on the disk medium 2 or reads the data from the disk medium 2.

The slider 3 and the magnetic head integrated therewith move on the surface of the disk medium 2 so as to store a magnetic display of data in any tracks on the disk medium 2. In the magnetic disk device, the movement of the head is caused by the rotation about the actuator axis 20. By rotating the actuator arm pair 5, the slider 3 and the magnetic head therein can be located at any tracks on the surface of the disk medium 2.

Figure 3:
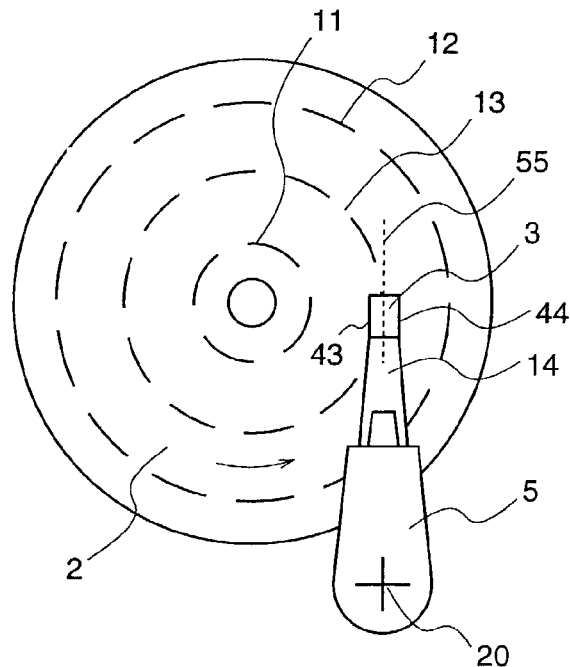
FIG. 3 is a schematic diagram illustrating a disk medium and an actuator arm according to the first embodiment of the invention.

FIG. 3 is a schematic diagram illustrating one disk medium 2 and the actuator arm 5 seen from above. As is well known as an art of the magnetic disk device, there are lines of concentric tracks in which magnetic data is recorded, on each of the magnetic media 2. An inside diameter (ID) track 11 is the innermost concentric track for storing the data. An outside diameter (OD) track 12 is the outermost concentric track for storing the data. The direction of movement on the surface of the disk medium 2 (direction of rotation of the disk medium 2) with respect to the ordinate 55 of the slider 3 is referred to as a skew angle, which varies vastly from the ID track 11 to the OD track 12. This variation also depends on a position where the actuator arm pair 5 is attached to the rotation actuator axis 20. The skew angle can be both positive and negative. When the actuator arm pair 5 is located so that the movement direction corresponds to an outer circumference side end 44 of the slider 3, the skew angle is positive. When the actuator arm pair 5 is located so that the movement direction corresponds to an inner circumference side end 43 of the slider 3, the skew angle is negative. That is, with reference to FIG. 3, the skew angle is the largest at the OD track 12, the smallest at the ID track 11, and 0 degree at a middle diameter (MD) track 13. In this first embodiment, the disk medium has a radius of 12.5 mm and a skew angle of 16° at the outside diameter (OD) track 12, a radius of 6 mm and a skew angle of −5° at the inside diameter (ID) track 11, and a radius of 8.7 mm and a rotational velocity of 4500 rpm at the middle diameter (MD) track 13.

Figure 4:
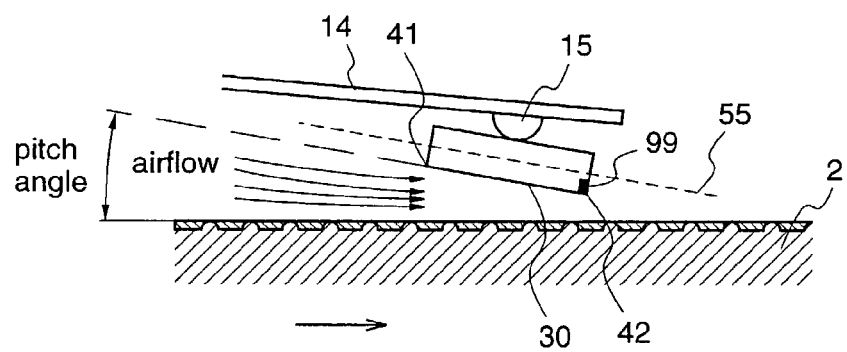
FIGS. 4($a$) and 4($b$) are schematic diagrams for explaining a flying posture of a slider according to the first embodiment of the invention.
Figure 4:
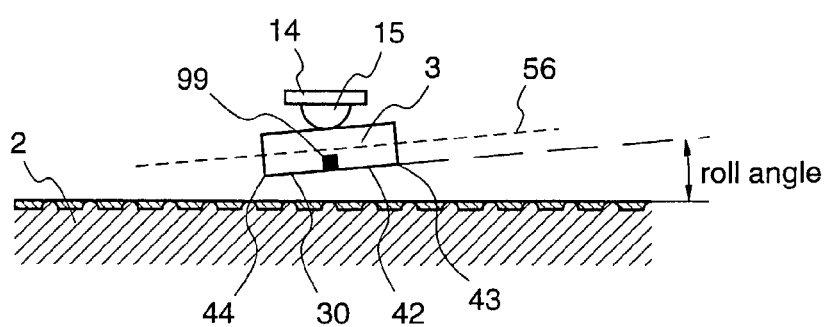

FIGS. 4(a) and 4(b) are schematic diagrams for explaining a flying posture of the slider 3 when the disk medium 2 steadily rotates to perform recording/reproduction. The slider 3 is attached to the suspension 14 by means of a pivot 15.

As shown in FIG. 4(a), when the disk medium 2 steadily rotates at a prescribed rotational velocity to perform recording/reproduction, the slider 3 flies from the surface of the disk medium 2, to have a flying posture in which the flying height on the air efflux end 42 side where a magnetic head 99 is attached is small. The inclination of the slider 3 with respect to the disk medium 2 in the ordinate 55 direction is generally referred to as a pitch angle. The pitch angle is positive when the flying height on the air efflux end 42 side is smaller than on an air influx end 41 side.

As shown in FIG. 4(b), the inclination of the slider 3 with respect to the disk medium 2 in the abscissa 56 direction is referred to as a roll angle. The roll angle is positive when the flying height on the disk outer circumference end 44 side is smaller than on the disk inner circumference end 43 side.

Figure 5:
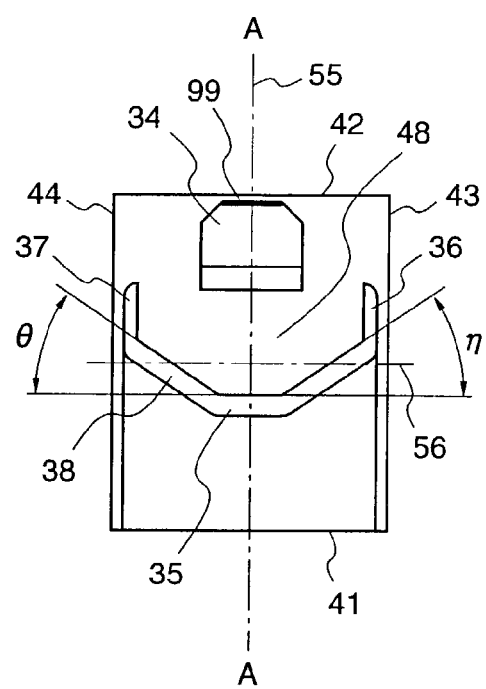
FIG. 5($a$) is a diagram illustrating the shape of an air bearing surface according to the first embodiment of the invention.
Figure 5:
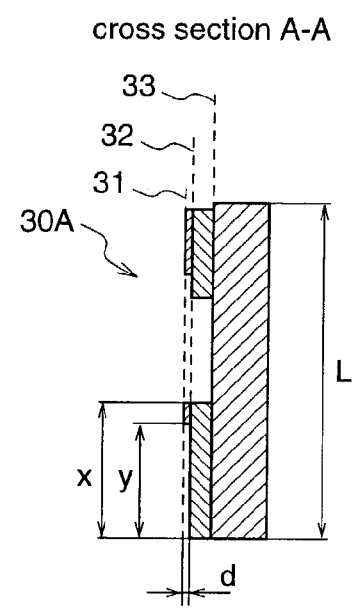

FIG. 5(a) is a diagram illustrating the shape of the air bearing surface of the slider 3 according to the first embodiment. FIG. 5(b) is a cross sectional view illustrating an A—A cross section of the air bearing surface.

With reference to FIGS. 5(a) and 5(b), an air bearing surface 30A comprises three steps of plane surfaces, an upper surface 31, a middle surface 32, and a lower surface 33, which are approximately parallel to each other. In FIGS. 5(a) and 5(b), a gap between the upper surface 31 and the middle surface 32 is 100 nm, and a gap between the middle surface 32 and the lower surface 33 is 700 nm.

The air influx end 41 faces toward the direction in which the surface of the disk medium 2 rotates. The rotating disk medium 2 lets airflow in the direction of movement of the disk medium 2 into a space under the air bearing surface 30A from the air influx end 41 by a viscosity effect. Pressure generated on the air bearing surface 30A by the airflow, that acts in the direction in which the slider 3 moves away from the disk medium 2 is referred to as positive pressure. Pressure that acts in the direction in which the slider 3 moves towards the disk medium 2 is referred to as negative pressure.

On the air bearing surface 30A, an air efflux side pad 34 for attaching the magnetic head 99 in the vicinity of the air efflux end 42, and an air influx side pad 38 are constructed by the upper surface 31. The air influx side pad 38 is formed by connecting a cross rail 35 which is formed at predetermined spaces from the inner circumference side end 43 and the outer circumference side end 44, an inner side rail 36 which is formed at predetermined spaces from the air influx end 41, the inner circumference side end 43, and the air efflux end 42, and an outer side rail 37 which is formed at predetermined spaces from the air influx end 41, the outer circumference side end 44, and the air efflux end 42 to each other. Further, the middle surface 32 is formed on the air influx end 41 side of each of the air efflux side pad 34 and the air influx side pad 38, thereby promoting air inflow into the pads 34 and 38. The approximately plane surface of the middle surface 32 that is formed on the air influx end side of the air influx side pad 38 extends to the air influx end 41. In center of the air bearing surface 30A, a negative pressure generation concave part 48 which is surrounded by the upper surface 31 or the middle surface 32 is formed by the lower surface 33. According to the air bearing surface 30A of this first embodiment, positive pressure is generated mainly by the pads 34 and 38, and negative pressure is generated by the negative pressure generation concave part 48.

The edge line on the air influx end side (cross rail 35) and the edge line on the side of the outer circumference side end (side rail 37) of the negative pressure generation concave part 48 are connected by an edge line having a recess angle θ with an abscissa 56 which is supposed to exist in the slider width direction. The edge line on the air influx end side (cross rail 35) and the edge line on the side of the inner circumference side end (side rail 36) are connected by an edge line having a recess angle η. While in FIGS. 5(a) and 5(b) θ is 0.2π (rad) and η is 0.2π (rad), the angles θ and η can be varied to some extent in the present invention. However, in order to obtain desired characteristics, θ and η are required to be within a predetermined range. Hereinafter, a description will be given of this range.

Figure 6:
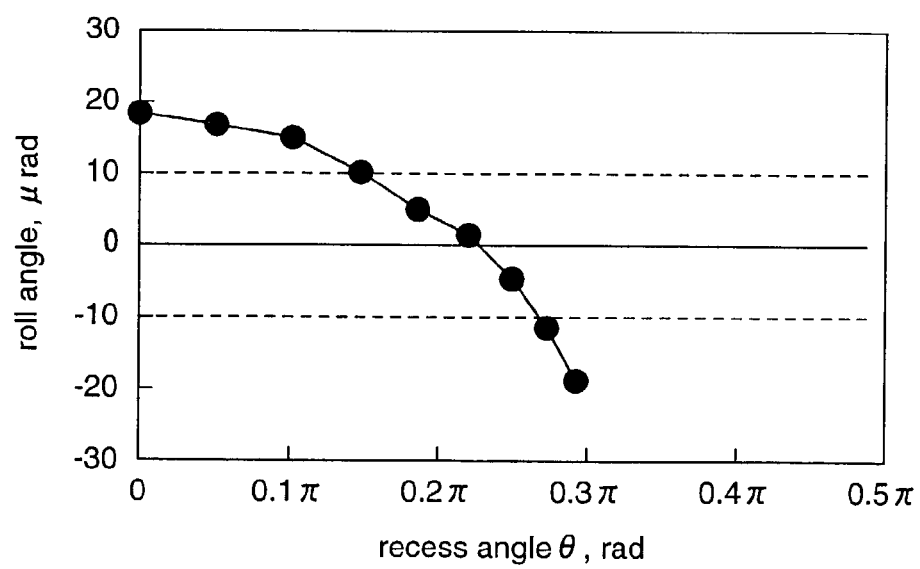
FIG. 6 is a diagram illustrating the relationship between a recess angle $\theta$ and a roll angle on the air bearing surface according to the first embodiment of the invention.

FIG. 6 is a diagram illustrating the result of analyzing the roll angle when the slider 3 having the air bearing surface 30A shown in FIGS. 5(a) and 5(b) is located at the OD track 12, as a function of the recess angle θ. In the magnetic disk device employed here, permissible flying height variation with respect to a targeted flying height of 25 nm at a position of the magnetic head 99 is +/−2 nm, and permissible roll angle variation with respect to a targeted roll angle of 0 μrad is +/−10 μrad. FIG. 6 shows that the roll angle varies with the recess angle θ, and is controlled so that its variation is equal to or smaller than the desired value according to the first embodiment in a range 0.14<θ<0.28π.

Figure 7:
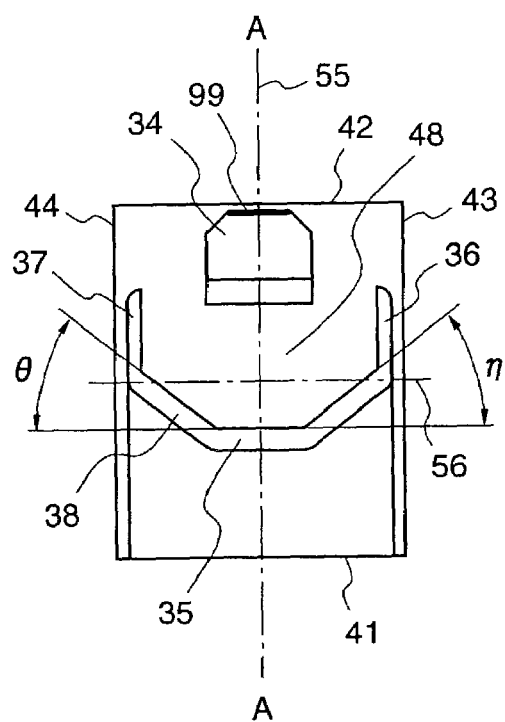
FIG. 7($a$) is a diagram illustrating the shape of the air bearing surface according to the first embodiment of the invention.
Figure 7:
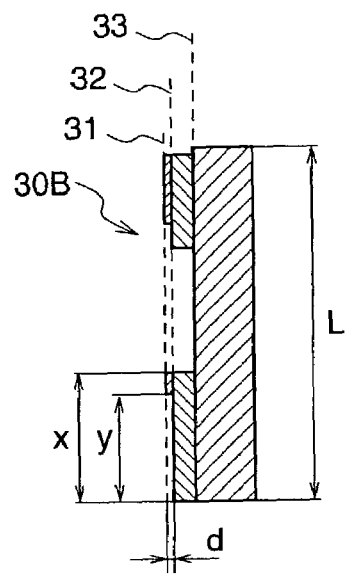
Figure 8:
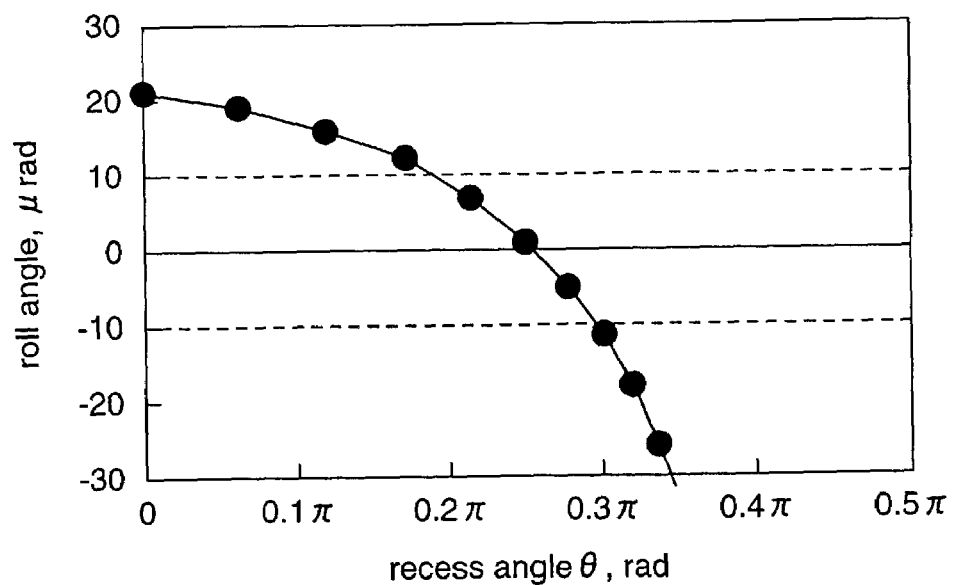
FIG. 8 is a diagram illustrating the relationship between the recess angle $\theta$ and the roll angle on the air bearing surface according to the first embodiment of the invention.
Figure 9:
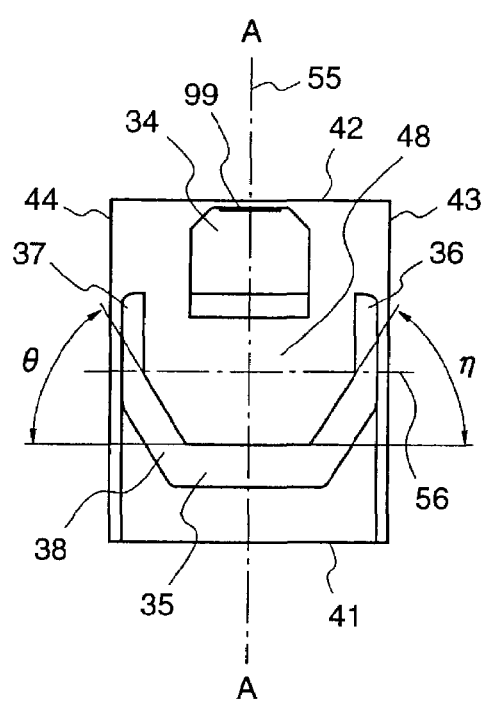
FIG. 9($a$) is a diagram illustrating the shape of the air bearing surface according to the first embodiment of the invention.
Figure 9:
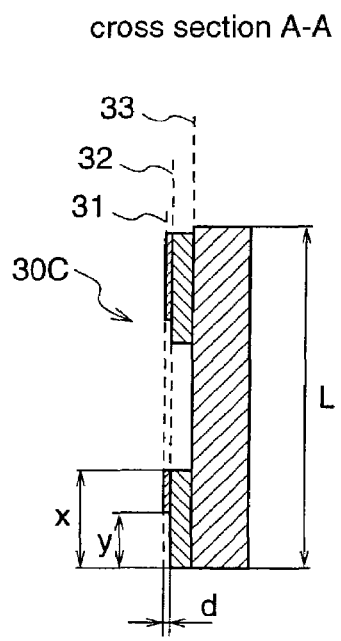
Figure 10:
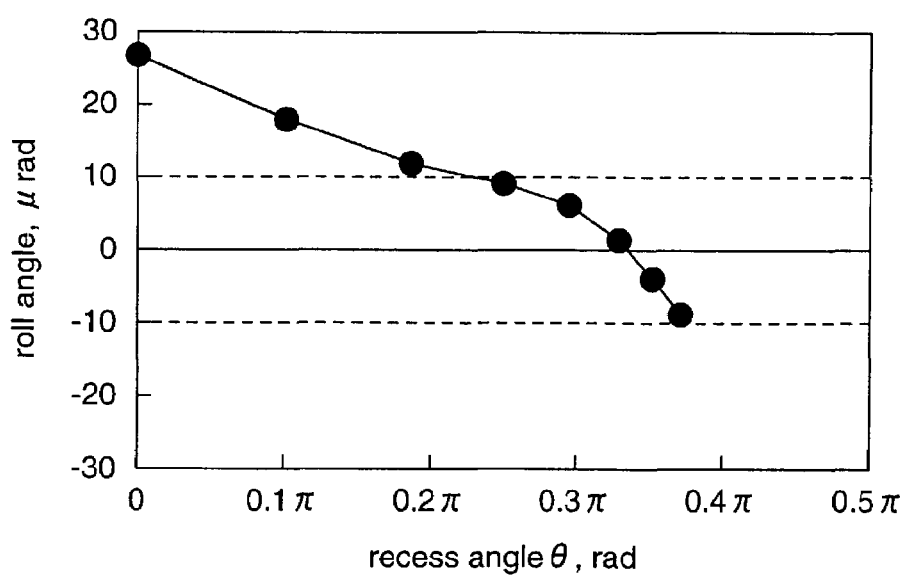
FIG. 10 is a diagram illustrating the relationship between the recess angle $\theta$ and the roll angle on the air bearing surface according to the first embodiment of the invention.

FIG. 8 is a diagram illustrating the relationship between the roll angle and the recess angle θ at the OD track 12 with respect to an air bearing surface 30B shown in FIGS. 7(a) and 7(b). FIG. 10 is a diagram illustrating the relationship between the roll angle and the recess angle θ at the OD track 12 with respect to an air bearing surface 30C shown in FIGS. 9(a) and 9(b). Differences in level between the upper surface 31, the middle surface 32, and the lower surface 33, respectively, of the air bearing surfaces 30B and 30C are identical to those in the air bearing surface 30A. FIG. 8 shows that with respect to the air bearing surface 30B, the variation of the roll angle is controlled so as to be equal to or smaller than the desired value in a range 0.19<θ<0.30. FIG. 10 shows that with respect to the air bearing surface 30C, the variation of the roll angle is controlled so as to be equal to or smaller than the desired value in a range 0.22π<θ<0.38π.

Here, with respect to each of the air bearing surfaces 30A, 30B, and 30C, a distance "x" from the air influx end 41 to the negative pressure generation concave part 48 is standardized by the length L of the slider to make X=x/L. When the relationship between θ×X and the roll angle is obtained, a noteworthy matter becomes apparent. Hereinafter, a description will be given of this relationship. With respect to the air bearing surfaces 30A, 30B, and 30C of the first embodiment, X is 0.405, 0.364, and 0.283, respectively.

Figure 11:
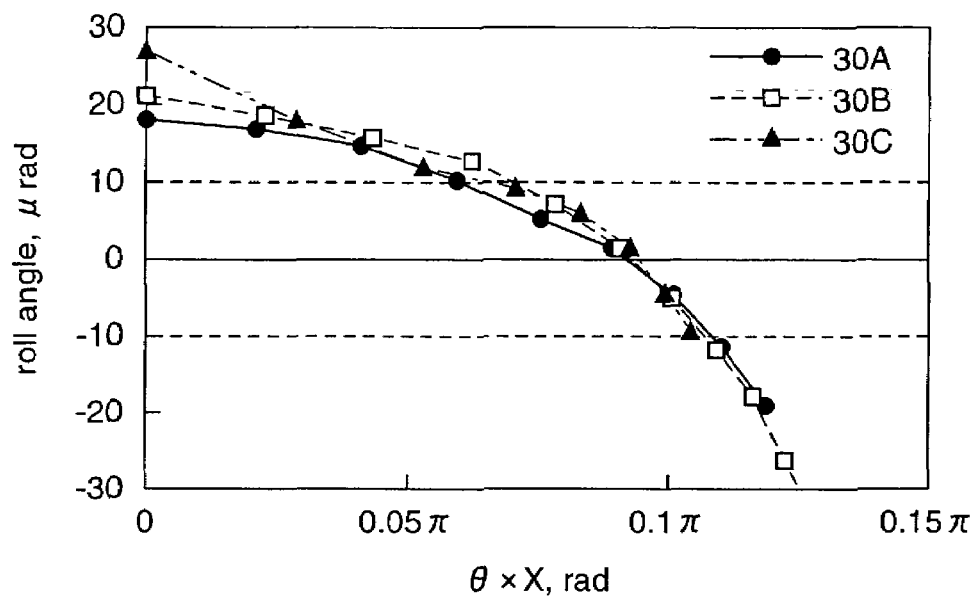
FIG. 11 is a diagram illustrating the relationship between $\theta \times X$ and the roll angle on the air bearing surface according to the first embodiment of the invention.

FIG. 11 is a diagram collectively illustrating the respective results shown in FIGS. 6, 8, and 10 with the abscissa being θ×X. A mark ● shows the result with respect to the air bearing surface 30A, a mark □ shows the result with respect to the air bearing surface 30B, and a mark ▲ shows the result with respect to the air bearing surface 30C. According to FIG. 11, with respect to all the air bearing surfaces 30A, 30B, and 30C, ranges in which the desired roll angle is obtained are in accord; the range is 0.06π<θ×X<0.12π. That is, by forming an edge line having the recess angle θ in the region where 0.06π<θ×X<0.12π is achieved, the roll angle of the slider 3 in a region in which the skew angle is positive is controlled so that its variation is equal to or smaller than the desired value, and thus a stable flying posture of the slider 3 can be obtained in the region in which the skew angle is positive, thereby securing a stable flying height at a position of the minimum flying height.

Further, FIG. 11 shows the optimum value for θ×X to control the roll angle variation is 0.09π.

Figure 12:
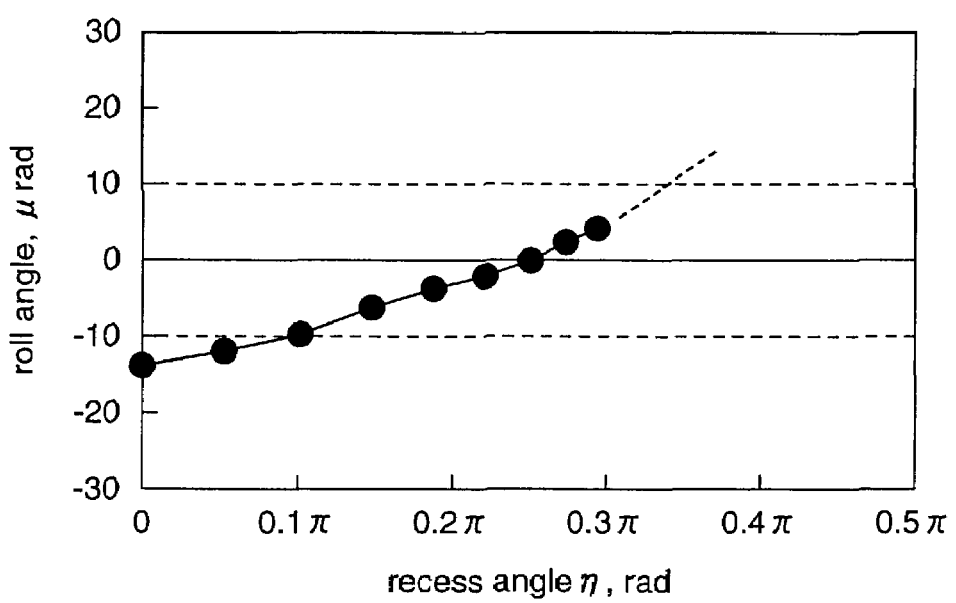
FIG. 12 is a diagram illustrating the relationship between a recess angle $\eta$ and the roll angle on the air bearing surface according to the first embodiment of the invention.
Figure 13:
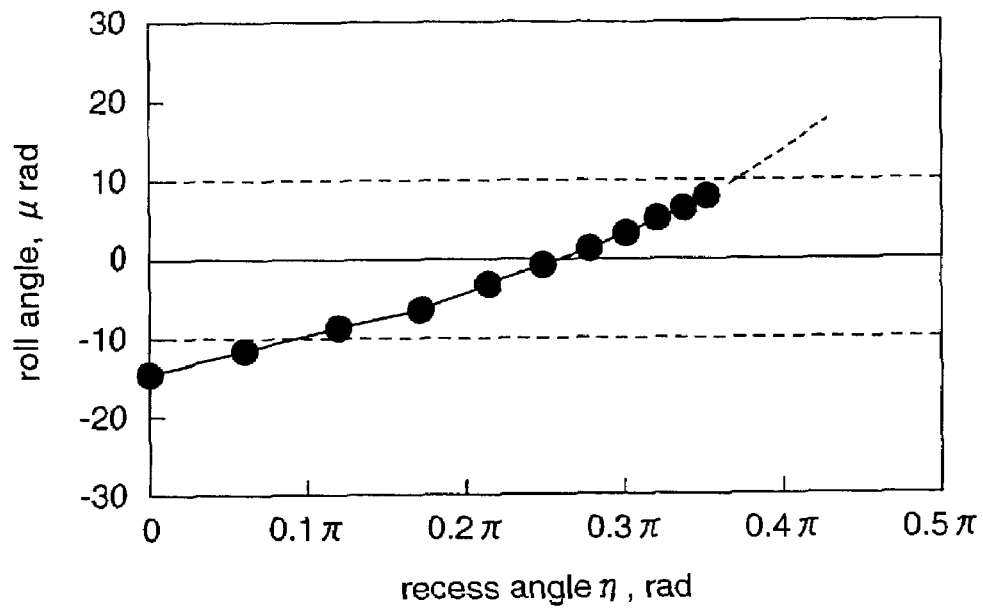
FIG. 13 is a diagram illustrating the relationship between the recess angle $\eta$ and the roll angle on the air bearing surface according to the first embodiment of the invention.
Figure 14:
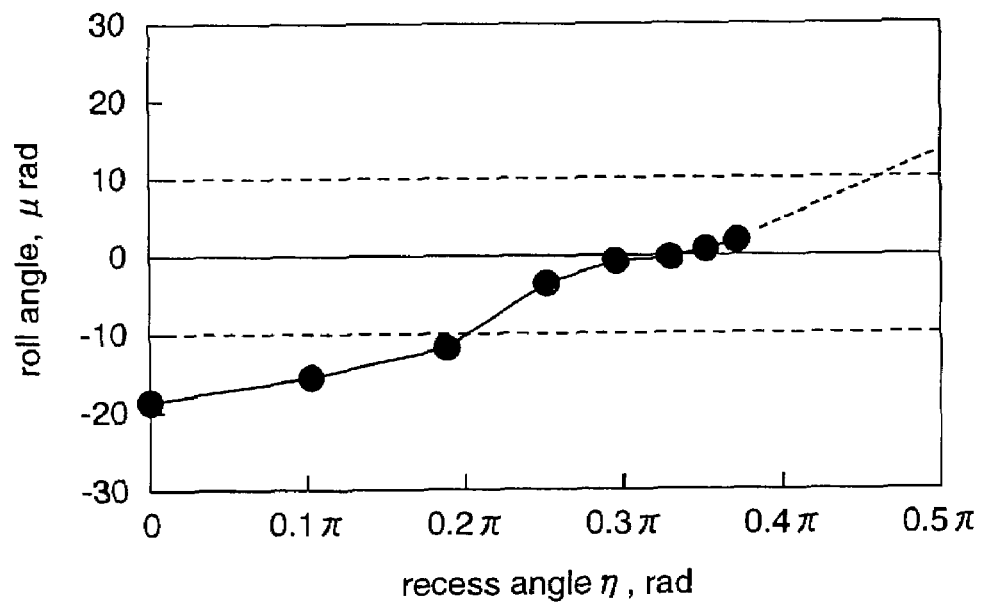
FIG. 14 is a diagram illustrating the relationship between the recess angle $\eta$ and the roll angle on the air bearing surface according to the first embodiment of the invention.

Next, a description will be given of a roll angle control in a region in which the skew angle is negative. FIGS. 12, 13, and 14 are diagrams illustrating the relationship between the roll angle and the recess angle η at the ID track 11 with respect to the air bearing surfaces 30A, 30B, and 30C, respectively. FIG. 12 shows that with respect to the air bearing surface 30A, the variation of the roll angle is controlled so as to be equal to or smaller than the desired value in a range 0.10π<η<0.35π. FIG. 13 shows that with respect to the air bearing surface 30B, the variation of the roll angle is controlled so as to be equal to or smaller than the desired value in a range 0.12π<η<0.38π. FIG. 14 shows that with respect to the air bearing surface 30C, the variation of the roll angle is controlled so as to be equal to or smaller than the desired value in a range 0.20π<η<0.47π.

Figure 15:
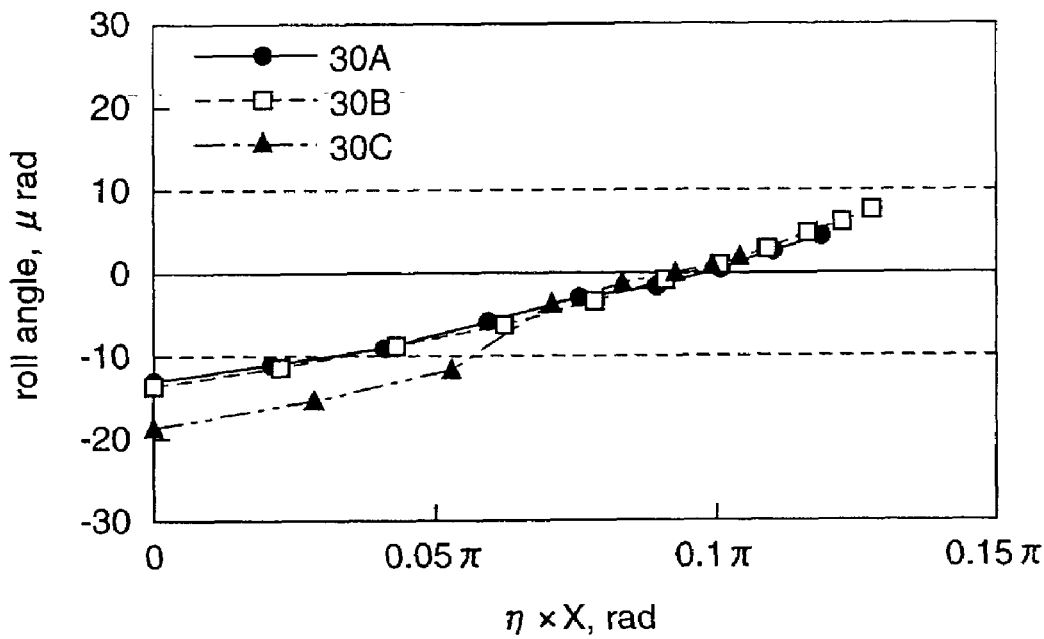
FIG. 15 is a diagram illustrating the relationship between $\eta \times X$ and the roll angle on the air bearing surface according to the first embodiment of the invention.

FIG. 15 is a diagram collectively illustrating the respective results shown in FIGS. 12, 13, and 14 with the abscissa being η×X. A mark ● shows the result with respect to the air bearing surface 30A, a mark □ shows the result with respect to the air bearing surface 30B, and a mark ▲ shows the result with respect to the air bearing surface 30C. According to FIG. 15, with respect to all the air bearing surfaces 30A, 30B, and 30C, ranges in which the desired roll angle is obtained are in accord; the range is. 0.05π<η×X<0.13π. That is, by forming an edge line having the recess angle η in the region where 0.05π<η×X<0.13 π is achieved, the roll angle of the slider 3 in a region in which the skew angle is negative is controlled so that its variation is equal to or smaller than the desired value, and thus a stable flying posture of the slider 3 can be obtained in the region in which the skew angle is negative, thereby securing a stable flying height at the position of the minimum flying height.

Further, FIG. 15 shows the optimum value for η×X to control the roll angle variation is 0.09π.

Figure 16:
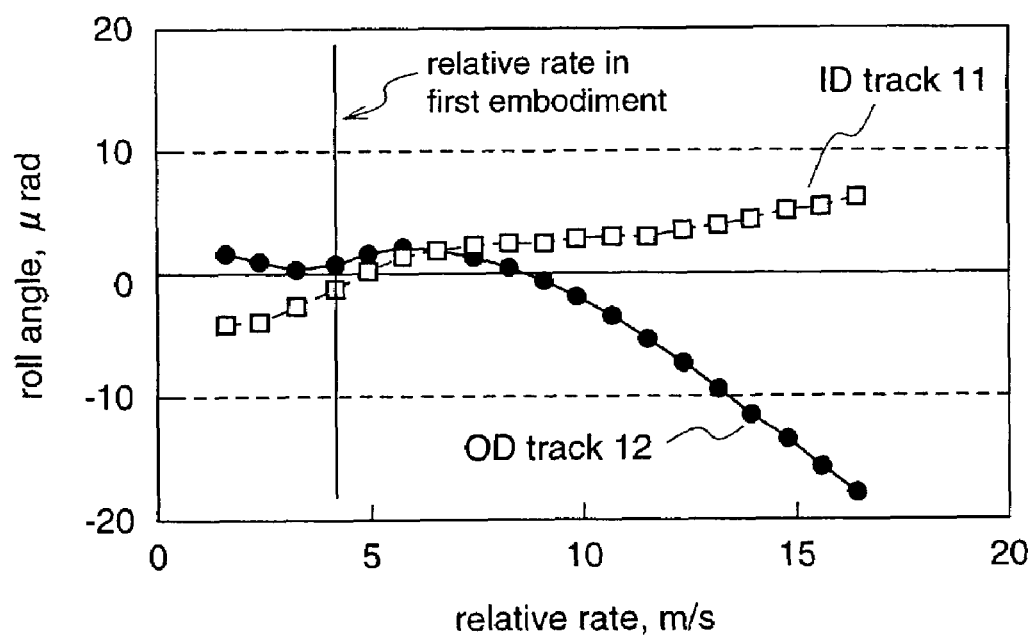
FIG. 16 is a diagram illustrating the relationship between the roll angle and a relative velocity according to the first embodiment of the invention.

FIG. 16 is a diagram illustrating the result of roll angle's dependence on a relative velocity of the disk medium 2 at the ID track 11 and the OD track 12 with respect to the air bearing surface 30A. The velocity is expressed by a value at the MD track 13 (having a skew angle of 0° and a radius of 8.7 mm). FIG. 16 shows that it is desired to employ a region in which the relative velocity is equal to or smaller than 13 m/s when the roll angle is required to be controlled to be equal to or smaller than +/−10 μrad as described with respect to this first embodiment.

Further, in the case of the slider 3 having the magnetic head 99 on the ordinate 55 as described with respect to the first embodiment, it is desired to form the negative pressure generation concave part 48 symmetrically with respect to the ordinate 55, so that the roll angle when the slider 3 is located at the MD track 13 is "0". Furthermore, it is desired that the air bearing surface 30 is symmetrical with respect to the ordinate 55.

Further, it is desired that the edge line having the recess angle θ is formed on the side of the outer circumference side end of the ordinate 55, so as to prevent the edge line having the recess angle θ from affecting the roll angle in the region where the skew angle is negative. Correspondingly, it is desired that the edge line having the recess angle η is formed on the side of the inner circumference side end of the ordinate 55 for the same reason as mentioned above.

Further, the recess angles θ and η are defined by angles which are formed by a virtual line connecting the edge line on the air influx end side and the edge line on the side of the outer circumference side end or the side of the inner circumference side end, with the abscissa 56. While the edge lines having the recess angles θ and η are shown as linear lines in the first embodiment, they may be curved lines as long as effects of the present invention are practically obtained.

As described above, according to the slider and the disk device of the first embodiment, the edge line on the air influx end side and the edge line at the disk outer circumference side end are connected by the edge line having the recess angle θ (rad) with the abscissa which is supposed to exist in the slider width direction, so as to form the negative pressure generation concave part 48 on the air bearing surface 30, and when the distance "x" from the air influx end 41 to the negative pressure generation concave part 48 of the air bearing surface 30 is standardized by the length L of the slider 3 to make X=x/L, by placing 0.06π~0.12π for θ×X, variation of the roll angle in the region where the skew angle is positive can be suppressed, thereby securing a stable flying height at the position of the minimum flying height.

Further, the edge line on the air influx end side and the edge line at the disk inner circumference side end are connected by the edge line having the recess angle η (rad) with respect to the abscissa which is supposed to exist in the slider width direction, so as to form the negative pressure generation concave part 48 on the air bearing surface 30, and when the distance "x" from the air influx end 41 to the negative pressure generation concave part 48 of the air bearing surface 30 is standardized by the length L of the slider to make X=x/L, by placing 0.05π~0.13π for η×X, variation of the roll angle in region where the skew angle is positive can be suppressed, thereby securing a stable flying height at the position of the minimum flying height.

Embodiment 2

Hereinafter, a slider and a disk device according to a second embodiment of the present invention will be described with reference to the drawings.

Figure 17:
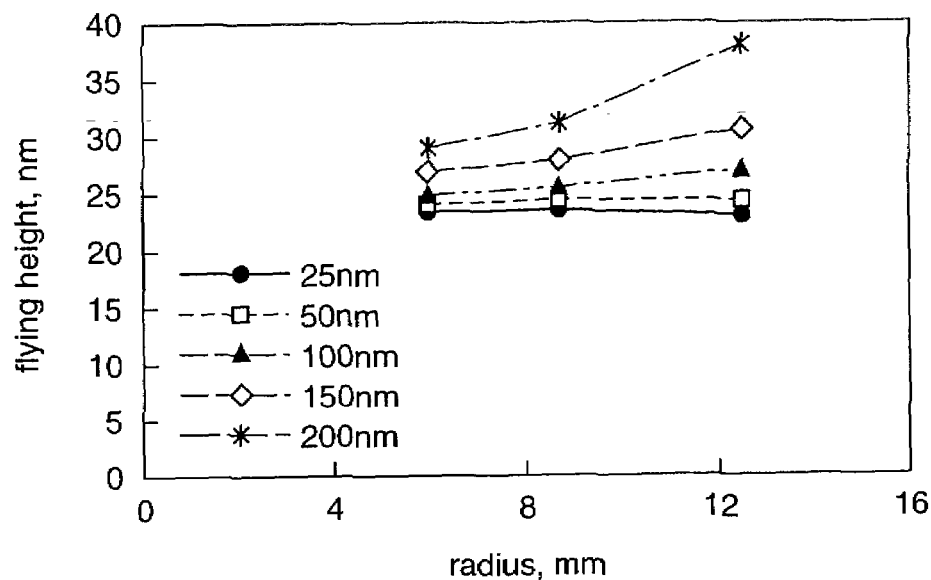
FIG. 17 is a diagram illustrating the relationship between a flying height of a slider and a disk radius position according to a second embodiment of the present invention.

FIG. 17 is a diagram illustrating flying heights from an ID track 11 to an OD track 12 in cases where a difference in level "d" between the upper surface 31 and the middle surface 32 of the air bearing surface 30A in FIGS. 5(a) and 5(b) is 25 nm, 50 nm, 100 nm, 150 nm, and 200 nm. A mark ● shows the case where the level difference "d" is 25 nm, a mark □ shows the case where the level difference "d" is 50 nm, a mark ▲ shows the case where the level difference "d" is 100 nm, a mark ◇ shows the case where the level difference "d" is 150 nm, and a mark * shows the case where the level difference "d" is 200 nm. A relative velocity between a slider 3 and the disk medium 2 according to the first embodiment at the MD track 13 of the disk medium 2 with a steady rotational velocity of 4500 rpm is 2π×8.7×(4500/60)≈4100 mm/s=4.1 m/s. FIG. 17 shows that a larger level difference "d" tends to cause an increase of the flying height especially at the OD track 12, resulting in a wider difference between the flying height at the ID track 11 and that at the OD track 12.

Figure 18:
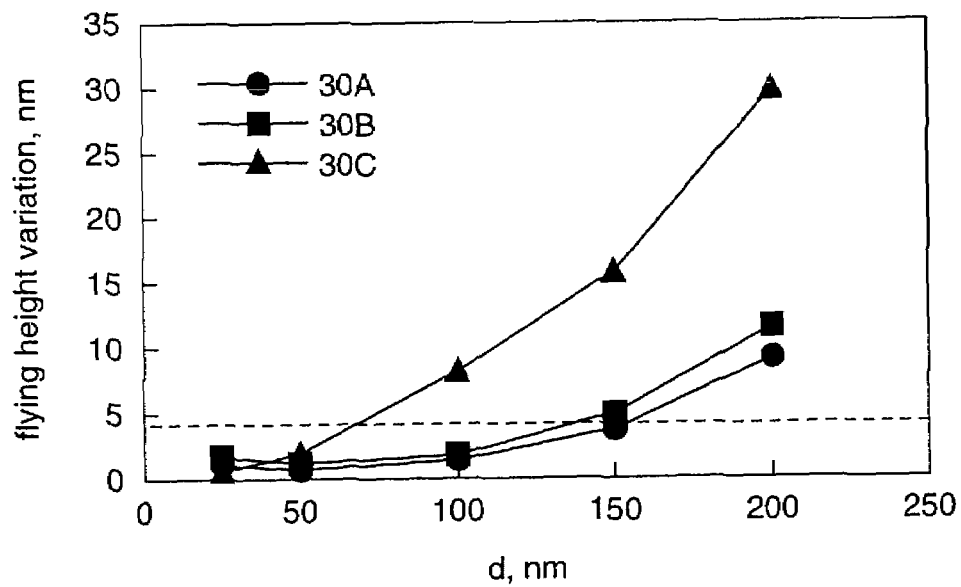
FIG. 18 is a diagram illustrating the relationship between a level difference "d" on an air bearing surface and the flying height of the slider according to the second embodiment of the invention.

FIG. 18 is a diagram illustrating the relationship between the level difference "d" and flying height variation in the range from the ID track 11 to the OD track 12, with respect to the respective air bearing surfaces 30A, 30B, and 30C. FIG. 18 shows that a larger level difference "d" causes a greater flying height variation with respect to all the air bearing surfaces 30A, 30B, and 30C.

Figure 19:
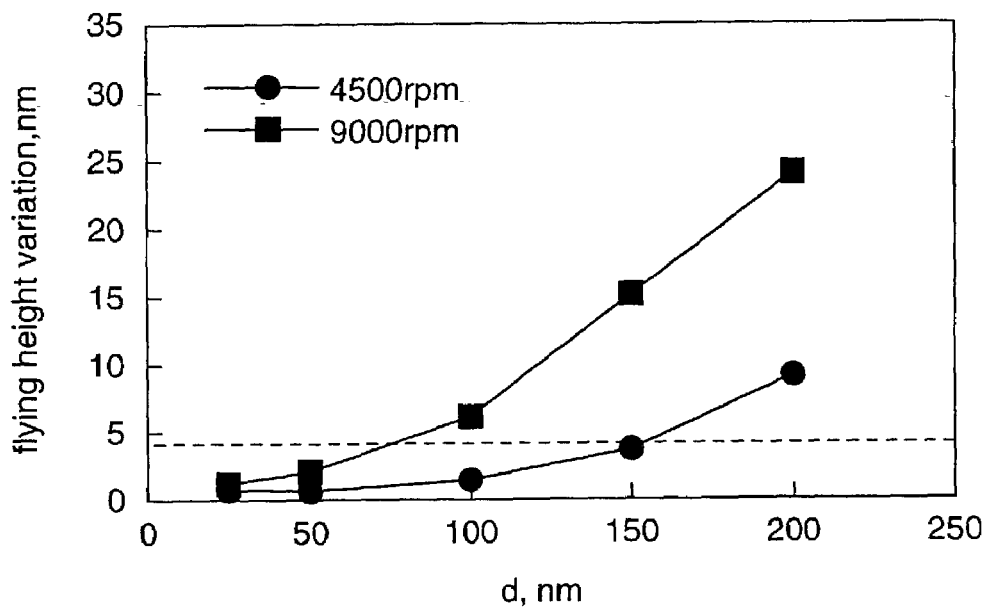
FIG. 19 is a diagram illustrating the relationship between the level difference "d" on the air bearing surface and the flying height of the slider according to the second embodiment of the invention.

FIG. 19 is a diagram illustrating the relationship between the level difference "d" and the flying height variation with respect to the air bearing surface 30A in cases where a disk rotational velocity is 4500 rpm and 9000 rpm. FIG. 19 shows that even when the rotational velocity of the disk medium 2 (relative velocity between the slider 3 and the disk medium 2) is different, a larger level difference "d" similarly tends to cause a greater flying height variation. Further, with reference to FIG. 19, a higher relative velocity causes a greater flying height variation in the range from the ID track 11 to the OD track 12.

Here, the relative velocity between the slider 3 and the disk medium 2 at the MD track 13 is V(mm/s), a distance from an air influx end 41 to an air influx side pad 38 is y(mm), and the abscissa is V×(d/y) (hereinafter, V×(d/y) is referred to as an accommodation coefficient α). When the flying height variation under the respective conditions is put in order, a new trend is apparent. The distance "y" is strictly a distance from the air influx end 41 to the leading edge of the air influx side pad 38, that is, from the air influx end 41 to the outer edge of the air influx side pad 38 which is nearest to the air influx end 41. Further, the distance "y" is 0.41 mm on the air bearing surface 30A, 0.35 mm on the air bearing surface 30B, and 0.19 mm on the air bearing surface 30C.

Figure 20:
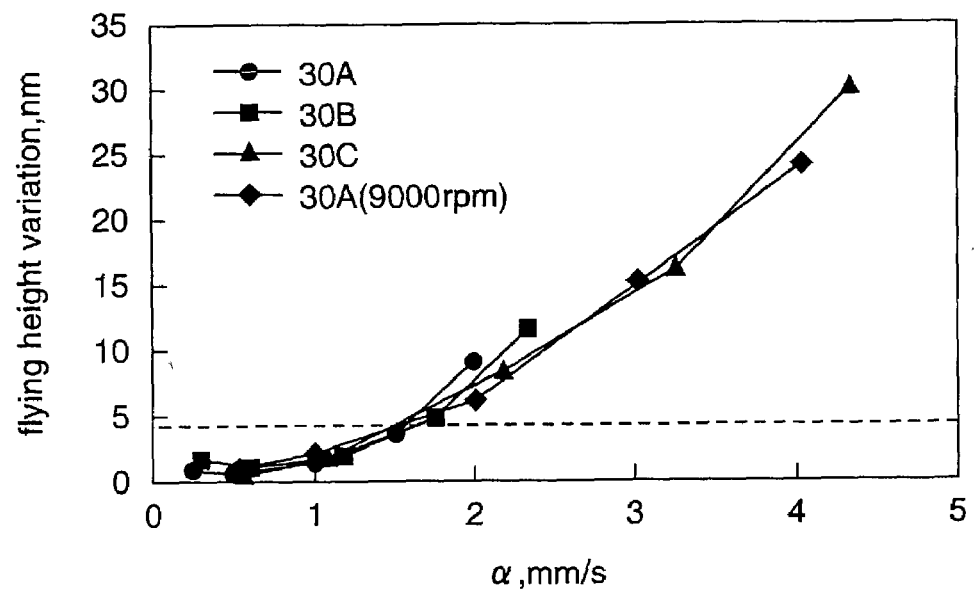
FIG. 20 is a diagram illustrating the relationship between an accommodation coefficient α and flying height variation according to the second embodiment of the invention.
Figure 21:
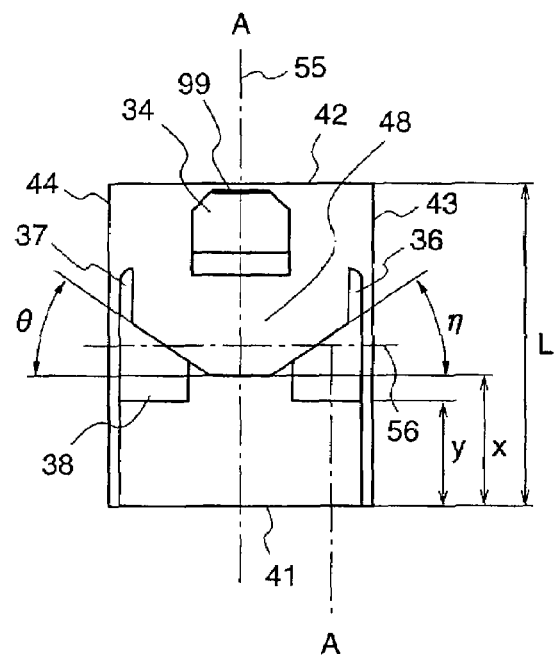
FIG. 21(a) is a diagram illustrating the shape of the air bearing surface.
FIG. 21(b) is a diagram illustrating the cross section of the air bearing surface.
Figure 21:
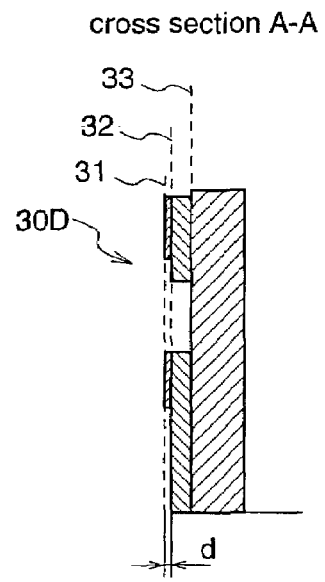
Figure 22:
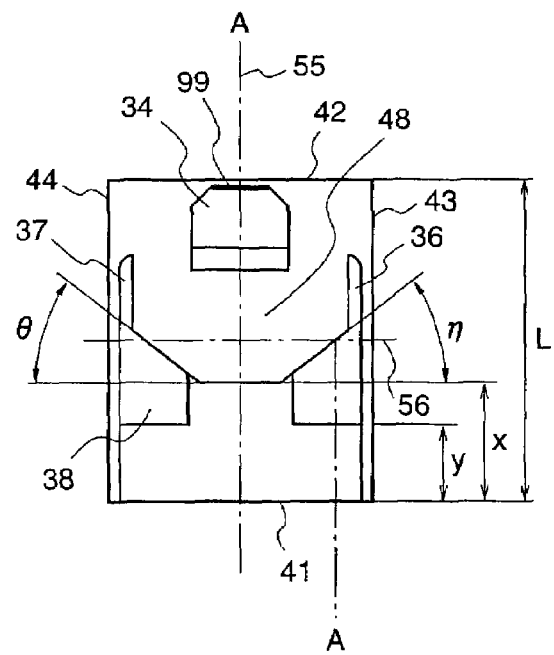
FIG. 22(a) is a diagram illustrating the shape of the air bearing surface.
FIG. 22(b) is a diagram illustrating the cross section of the air bearing surface.
Figure 22:
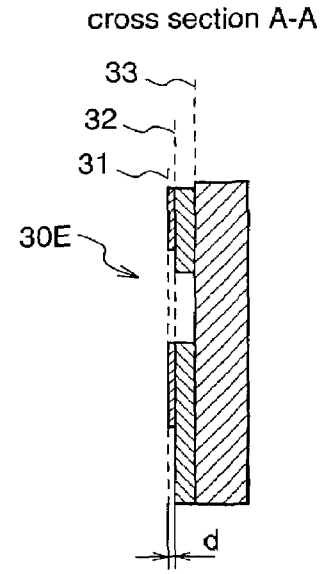
Figure 23:
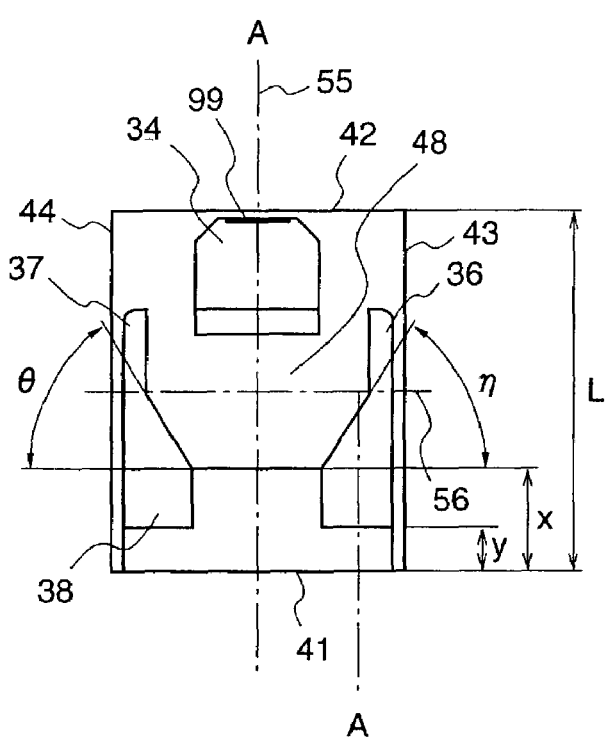
FIG. 23(a) is a diagram illustrating the shape of the air bearing surface.
FIG. 23(b) is a diagram illustrating the cross section of the air bearing surface.
Figure 23:
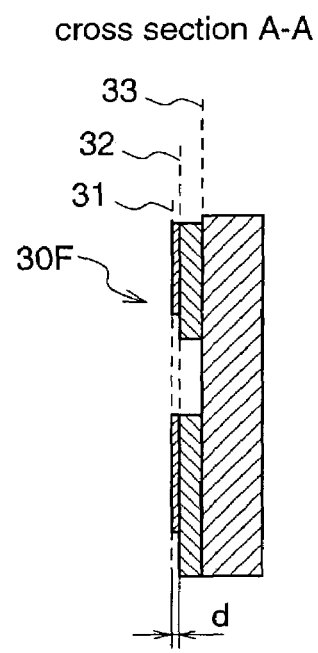

FIG. 20 is a diagram illustrating the relationship between the accommodation coefficient α and the flying height variation with respect to the respective air bearing surfaces 30A, 30B, and 30C. Marks ●, ■, and ▲ show the results with respect to the air bearing surfaces 30A, 30B, and 30C, respectively, when the steady rotational velocity is 4500 rpm, and a mark ◆ shows the result with respect to the air bearing surface 30A when the rotational velocity is 9000 rpm (V≈8200 mm/s=8.2 m/s). With reference to FIG. 20, with the flying height variation being a function of the accommodation coefficient α, the results with respect to all the air bearing surfaces 30A, 30B, and 30C are in agreement, and it is in a region where the accommodation coefficient α is equal to or smaller than 1.5 that the flying height variation from the ID track 11 to the OD track 12 is equal to or smaller than 4 nm (equal to or smaller than +/−2 nm). Moreover, in a region where the accommodation coefficient α is equal to or smaller than 1.0, the flying height variations are nearly constant at a value approximately equal to or smaller than 2 nm (+/−1 nm). Further, in a region where the accommodation coefficient α is larger than 2.0, the flying height variations from the ID track 11 to the OD track 12 tend to be sharply increased in concert.

Therefore, by composing V, "d", and "y" so that the accommodation coefficient α is equal to or smaller than 1.5, desirably equal to or smaller than 1.0, an increase of the flying height mainly at positions where the disk radius is larger than the MD track 13 can be suppressed, and the flying height variation can be suppressed so that it is equal to or smaller than the desired value in the range from the ID track 11 to the OD track 12, thereby securing a stable flying height at all the positions from the ID track 11 to the OD track 12 on the disk medium 2.

Since the level difference "d" is set at 100 nm in the first embodiment, the effects of the present invention are obtained with respect to the air bearing surfaces 30A and 30B. However, when the level difference "d" is constructed to be 50 nm, the effects of the present invention can be obtained with respect to the air bearing surface 30C as well.

Further, with respect to the air bearing surfaces 30A and 30B of the first embodiment, the recess angles θ and η, and the accommodation coefficient α are set at values within the range according to the present invention, whereby a stable flying height and flying posture can be maintained in the whole region from the ID track 11 to the OD track 12 on the disk. Further, also with respect to the air bearing surface 30C, the recess angles θ and η are set at values within the above-mentioned range, thereby maintaining a stable flying posture. Thus, the magnetic disk device provided with the slider according to the present invention suppresses head crush and realizes higher electromagnetic conversion efficiency and reliability.

As described above, according to the slider and the disk device of the second embodiment, when the relative velocity between the slider 3 and the disk medium 2 at the MD track 13 is V (mm/s), the level difference between the air influx side pad 38 and the approximately plane surface formed on the air influx end side of the air influx side pad 38 is "d" (mm), and the distance from the air influx end 41 to the air influx side pad 38 is "y" (mm), by composing V, "d", and "y" so that V×(d/y) is equal to or smaller than 1.5, the flying height variation of the slider 3 which depends on the relative velocity can be suppressed. That is, the flying height variation can be suppressed so that it is equal to or smaller than the desired value in the whole range from the ID track 11 to the OD track 12, thereby maintaining a stable flying height at all the positions from the ID track 11 to the OD track 12.

Since V×(d/y) has a velocity unit (mm/s), the accommodation coefficient α is supposed to be physically a function of a friction velocity. Currently, in nearly every magnetic disk device, a bearing film between the slider 3 and the disk medium 2 is formed by air. However, for example, in a nitrogen-sealed disk device, an argon-sealed disk device, or the like, the optimum accommodation coefficient α is not restricted to that described above. In that case, the accommodation coefficient corresponding to each of the gases is supposed to be obtained by multiplying the accommodation coefficient α shown here by the ratio of the viscosity of the gas to the viscosity of air.

Also, with respect to air bearing surfaces 30D to 30F shown in FIGS. 21(a) to 23(b), the recess angles θ and η, and the accommodation coefficient α are set at values within the range according to the present invention, whereby variations of roll angle and flying height in the region from the ID track 11 to the OD track 12 are suppressed, resulting in a stable flying posture and a constant flying height. Here, though the air bearing surfaces 30D to 30F shown in FIGS. 21(a) to 23(b) are not provided with cross rails 35 differently from the air bearing surface shown in FIGS. 5(a) and 5(b), the same effects as the effects of the above-described respective embodiments can be also achieved with respect to these air bearing surfaces. At this time, when a magnetic head 99 is on the ordinate as described in the first embodiment, it is desirable that the roll angle is as near to "0" as possible. Thus, when a negative pressure generation concave part 48 and the air bearing surface 30 are formed symmetrically with respect to the ordinate as shown in FIGS. 5(a) and (b), 7(a) and (b), 9(a) and (b), and 21(a)–23(b), the roll angle at the MD track 13 can be "0" and, therefore, the roll angle in the range from the ID track 11 to the OD track 12 can be near to "0".

While each of the air bearing surfaces 30 shown in the above-described respective embodiments comprises the three steps of the upper surface 31, the middle surface 32, and the lower surface 33, this is so designed in consideration of the current processing, and thus the air bearing surface 30 may comprises steps of an arbitrary number which is equal to or larger than 2.

While in the above-described respective embodiments the description has been given of the case where the slider 3 has the magnetic head 99, the slider 3 may have, for example, an optical head or a head like a magnetic-resistance-type element as a reproduction side head, so as to realize a slider which can secure a stable flying posture and a constant flying height, and a disk device.

Further, also in a small size disk device based on the PCMCIA standard or the Compact Flash standard, a stable flying posture and a constant flying height can be secured by employing the slider according to the present invention, resulting in data recording/reproduction with high reliability.

APPLICABILITY IN INDUSTRY

As described above, the slider and the disk device according to the present invention are suited as a slider which flies from a disk medium by airflow between an air bearing surface and the disk medium, to record/reproduce data on/from the disk medium, and a disk device employing this slider.

The invention claimed is:

1. A slider comprising:
    a head for recording and/or reproducing data on/from a disk medium;
    an air bearing surface having a concave part for generating negative pressure; and
    an air influx side pad located at an air influx end side of the concave part, the air influx side pad crossing a center of the slider in a slider longitudinal direction and being located at a top approximately plane surface of the air bearing surface, wherein
    when a relative velocity between the slider and the disk medium, at a position where a skew angle formed by an ordinate passing through the center of the slider in the slider longitudinal direction and a disk rotating direction is 0 (rad), is V (mm/s), a difference in level between the top approximately plane surface of the air influx side pad and an approximately plane surface formed at an air influx end side of the air influx side pad is "d" (mm), and a distance from an air influx end of the slider to the air influx side pad is "y" (mm), the following expression is obtained:

$V \times (d/y) < 1.5$.

2. The slider as defined in claim 1, wherein
    the following expression is obtained:

$V \times (d/y) < 1.0$.

3. The slider as defined in claim 1, wherein
    the top approximately plane surface formed at the air influx end side of the air influx side pad extends to the air influx end of the slider.

4. The slider as defined in claim 1, wherein
    the air influx side pad includes a cross rail extending in a direction of an abscissa of the slider.

5. A disk device having the slider as defined in claim 1.

6. The disk device as defined in claim 5, wherein
    the concave part is symmetrical with respect to the ordinate passing through the center of the slider in the slider longitudinal direction.

7. The disk device as defined in claim 5, wherein
    the air bearing surface is symmetrical with respect to the ordinate passing through the center of the slider in the slider longitudinal direction.

8. The disk device as defined in claim 5, wherein the disk device is based on the PCMCIA standard.

9. The disk device as defined in claim 5, wherein the disk device is based on the Compact Flash standard.

* * * * *